Jan. 13, 1959 R. GARDNER, JR 2,868,953
ROTATABLE ARC WELDING TOOL
Filed March 28, 1957 2 Sheets-Sheet 1

INVENTOR.
Raymond Gardner, Jr.
BY
Frease & Bishop
ATTORNEYS

Jan. 13, 1959  R. GARDNER, JR  2,868,953
ROTATABLE ARC WELDING TOOL
Filed March 28, 1957  2 Sheets-Sheet 2
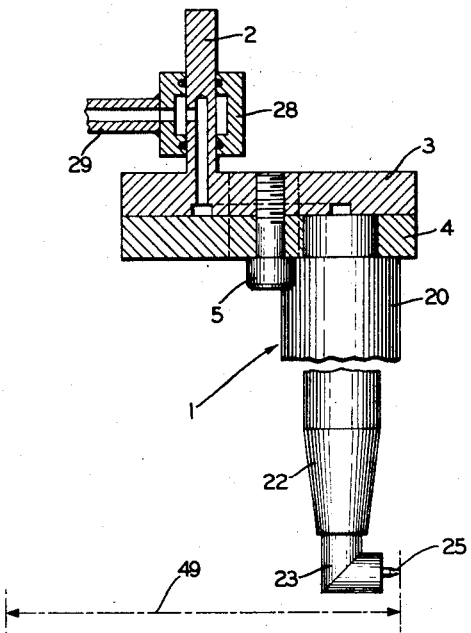
Fig.3
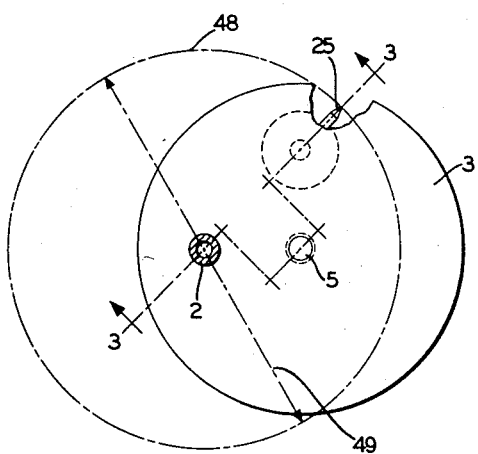
Fig.4
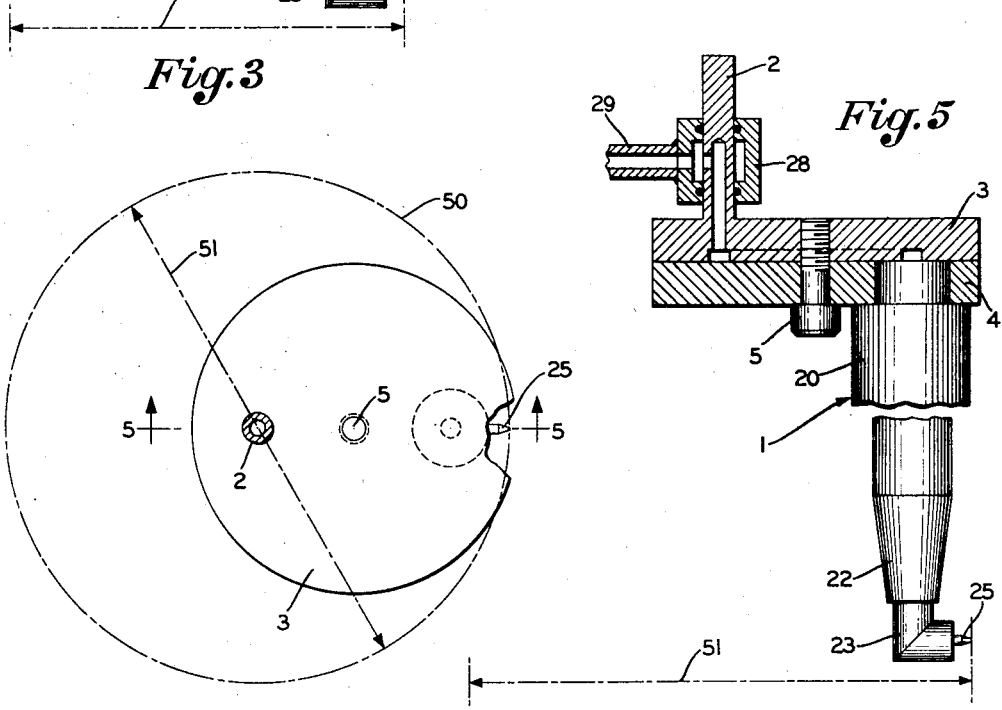
Fig.5
Fig.6
INVENTOR.
Raymond Gardner, Jr.
BY
Frease & Bishop
ATTORNEYS United States Patent Office 2,868,953
Patented Jan. 13, 1959

2,868,953
ROTATABLE ARC WELDING TOOL

Raymond Gardner, Jr., Massillon, Ohio, assignor to The Griscom-Russell Company, Massillon, Ohio, a corporation of Delaware Application March 28, 1957, Serial No. 649,186

8 Claims. (Cl. 219—125)

The invention relates to a rotatable arc welding tool, and more particularly to an arc welding tool having a rotatable welding tip which may be used to carry out a shielded arc welding operation internally of various sizes of small-diameter cylindrical parts.

Recent developments in the heat exchanger field have involved the use of an arc weld internally of small-diameter tubular parts which can be inspected for weld soundness after welding such as in the copending application of Karl A. Gardner, Raymond Gardner, Jr. and Frank Boni, Jr., filed March 28, 1957, Serial No. 649,037. Such arc welds also must be free of oxide formation in and around the weld which, if present, may result in an unsatisfactory welded joint.

It has been impossible heretofore to form such a welded joint internally of small-diameter cylindrical parts because no welding tools have been available which could be used to form such continuously welded joints.

Accordingly, it is a general object of the present invention to provide a new welding tool construction with which a satisfactory arc weld may be formed around the internal circumferential surfaces of small-diameter tubular parts.

Furthermore, it is an object of the present invention to provide a new arc welding tool construction having a shielded tungsten tip which may be rotated internally of small-diameter tubular parts to carry out a shielded arc welding operation.

Furthermore, it is an object of the present invention to provide an arc welding tool having a shielded tungsten tip which may be adjusted axially of the tool to form welds internally of small-diameter tubular parts at various axially-located positions within the tubular parts.

Also, it is an object of the present invention to provide a shielded arc tip welding tool in which the tool may be adjusted for revolving the tip in circular paths of different diameters so that the tool may be used to carry out a shielded arc welding operation internally of small diameter tubular parts of various diameters.

Furthermore, it is an object of the present invention to provide a new arc welding tool construction incorporating the described arrangements in which power and arc shielding gases may be supplied to the axially-adjustable and rotatable tip while rotating regardless of its adjustment for revolution in circular paths of various diameters.

Also, it is an object of the present invention to provide a new arc welding tool construction incorporating the described arrangements which may be built, adjusted and operated with extreme simplicity to satisfy the existing problems in the art.

Finally, it is an object of the present invention to provide a new welding tool construction which overcomes the difficulties heretofore encountered in the art of forming a satisfactory arc weld internally of small-diameter tubular articles, which satisfies an existing need, and which obtains many new results and advantages herein set forth.

These and other objects and advantages apparent to those skilled in the art from the following description and claims may be obtained, the stated results achieved, and the described difficulties overcome by the discoveries, apparatus, parts combinations, subcombinations and elements, which comprise the present invention, the nature of which is set forth in the following general statement, a preferred embodiment of which—illustrative of the best mode in which applicant has contemplated applying the principles—is set forth in the following description, and which are distinctly and particularly pointed out and set forth in the appended claims forming part hereof.

The nature of the improvements in welding tool construction of the present invention may be stated in general terms as preferably including a rotatable spindle, a distributor disc mounted on the spindle for rotation therewith, a retainer disc adjustably rotatably mounted on the distributor disc, collet clamping means mounted on the retainer disc adapted to extend axially with respect to the spindle in one position of adjustment of the retainer disc, a non-consumable preferably tungsten tip electrode adjustably clamped for axial adjustment in the collet means, insulator means surrounding the collet means and electrode, the insulator means having a nozzle through which the tip of the electrode projects; there being passages formed in the spindle, discs, collet means and insulator means communicating with the nozzle; an inlet connection communicating with said passages for supplying arc shielding gas to the electrode tip, and means for rotating the spindle.

By way of example, a preferred embodiment of the improved welding tool is illustrated in the accompanying drawings forming a part hereof wherein:

Fig. 3 is a fragmentary view similar to a portion of Fig. 1 on a smaller scale and looking in the direction of arrows 3—3, Fig. 4, illustrating another position of adjustment of the tool;

Fig. 4 is a view similar to Fig. 2 showing the path through which the tip of the welding tool revolves when adjusted as shown in Fig. 3;

Fig. 5 is a view similar to Fig. 3 looking in the direction of arrows 5—5, Fig. 6, showing still another position of adjustment; and Fig. 6 is a view similar to Figs. 2 and 4 illustrating the path of travel of the tool tip when adjusted as shown in Fig. 5.

Similar numerals refer to similar parts throughout the various figures of the drawings.

Figures 1, 2:
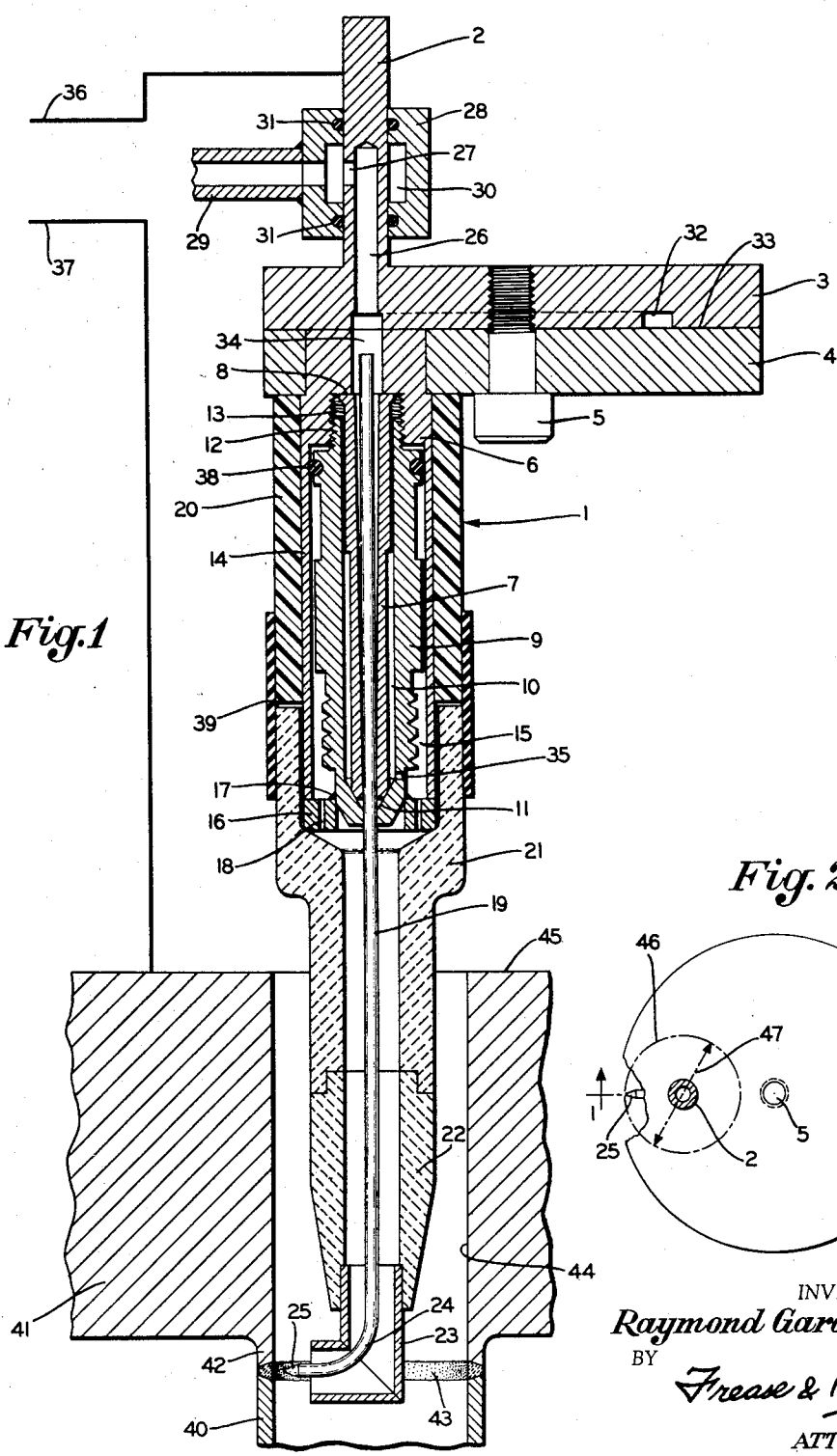
Figure 1 is an enlarged longitudinal axial sectional view looking in the direction of arrows 1—1, Fig. 2, of the improved welding tool in one position of adjustment, diagrammatically illustrating the tool performing an internal welding operation.
Fig. 2 is a diagrammatic top plan view illustrating the position of adjustment of the parts of the tool as shown in Fig. 1.

The improved welding tool is generally illustrated at 1 and includes a spindle 2 which may be attached to any suitable machine tool such as the spindle of a drill press type machine tool for rotating the welding tool 1 at any desired speed of rotation. A metal distributor disc 3 is preferably integrally mounted on the spindle 2 with its axis positioned eccentric to the axis of the spindle 2, as shown; and a retainer disc 4 is rotatably adjustably mounted on the disc 3 by a bolt 5 which may be used to clamp the discs 3 and 4 together in any desired position of adjustment.

The retainer disc 4 carries collet means which may include a metal collet retainer member 6 mounted on the disc 4 so as to extend axially of the spindle 2 in one position of adjustment of the disc 4, as shown in Fig. 1. The collet means also includes collet contractible jaws 7 which are clamped within the collet retainer 6 against shoulder 8 by collet holder member 9 having an internal bore 10 through which the collet jaws 7 extend. The internal bore 10 of the collet holder 9 is provided with a reduced tapered surface 11 at its lower end engaging the lower end of the collet jaws 7 to contract the collet jaws radially and clamp the collet jaws axially against the collet retainer shoulder 8.

The clamping of the collet jaws 7 by the collet holder 9 is accomplished by threading the reduced upper end 12 of the collet holder 9 into the threaded bore 13 of the collet retainer 6. The collet retainer 6 is provided with an external sleeve 14 surrounding the collet holder forming a compartment 15 therebetween. The collet holder 9 may have a flange-like disc 16 secured to its lower end by a welded joint 17 and member 16 abuts the lower end of sleeve portion 14 when the collet jaws are in the clamped position illustrated in Fig. 1. A series of openings 18 is preferably formed in the flange-like disc 16 for a purpose to be described. A welding electrode, preferably formed of tungsten, indicated at 19, extends axially through the collet means and may be clamped thereby in any desired position of axial adjustment.

The collet means is surrounded by an insulator sleeve 20 and second insulator sleeve 21 extends downward from the collet means surrounding a portion of the electrode 19 and having another insulator sleeve section 22 connected thereto. The sleeves 21 and 22 may preferably be formed of ceramic material to act as both electrical and heat insulators. The insulator sleeve 22 may be formed in various lengths depending upon the desired position of adjustment of the tip of electrode 19.

A preferably elbow-shaped stainless steel or ceramic tube 23 is mounted in the lower end of insulator sleeve 22 forming a nozzle for the tool through which the curved end 24 of the electrode 19 extends to its pointed tip end 25 disposed centrally of and outside of the nozzle formed by the elbow 23.

A central bore 26 is formed in the spindle 2 having an opening 27 communicating with the upper end of the bore. A stationary tubular gas inlet housing 28 surrounds the spindle 2 adjacent the location of the opening 27, and a pipe 29 connects with the interior 30 of the housing 28. The pipe 29 may be connected with any suitable source of supply of an inert arc shielding gas, such as helium or argon, and the joints between the housing 28 and rotatable spindle 2 may be sealed by suitable O-rings 31.

A circular groove 32 is formed in the surface 33 of distributor disc 3 against which the retainer disc 4 is clamped, to form an annular chamber communicating with the spindle bore 26. An axial bore 34 is formed in the collet retainer disc 6 which communicates with the groove 32 at any position of relative adjustment of the discs 3 and 4.

Thus, inert arc shielding gas supplied to the welding tool during rotation of the spindle 2 passes in through pipe 29 to housing chamber 30, then through opening 27 and spindle bore 26, then along groove 32 to collet retainer bore 34 and into the interior of the collet jaws 7. The gas then passes through the slits between the jaws of collet jaws 7 and into the interior of the internal bore 10 of the collet holder 9.

A passage opening 35 is formed in the collet holder 9 communicating between the bore 10 and the chamber 15 between the collet holder 9 and collet retainer sleeve 14. The arc shielding gases thus pass from the bore 10 through opening 35 into chamber 15 and thence through openings 18 to the interior of the tubular insulator sleeves 21 and 22 and out through the nozzle formed by the elbow 23 so that the gases discharged from the nozzle shield a welding arc that may be established between the tip 25 and the parts being welded.

Welding current may be supplied to the arc by connecting one line 36 of a power supply to the spindle so that current passes through the metal spindle and collet members to the electrode 19 and thence to the tip 25. The other side of the power supply may be connected by line 37 to one of the parts being welded.

Leakage of the arc shielding gas passing through the tool from collet retainer sleeve chamber 15 at its upper end is prevented by the O-ring seal 38; and any leakage of the arc shielding gas from the tool at the lower end of the collet means and the interior of the insulator sleeves 21 and 22 is prevented by flexible, preferably rubber, insulator connector sleeve 39 which forms the connection between insulator sleeves 20 and 21.

The improved welding tool construction is illustrated in Fig. 1 diagrammatically as performing a welding operation to weld tube 40 to the tube sheet 41 of a heat exchanger. For this purpose, a neck or nipple 42 projects from the tube sheet having the same inside diameter as the diameter of the tube 40 to be welded thereto. In forming a welded joint between the tube 40 and nipple 42, interiorly of the tubular parts, the welding tool tip 25 must traverse the line of the weld to be formed at a uniform distance therefrom in a circular path at the required speed in order to form a uniform weld 43.

Other requirements for forming a satisfactory weld are that oxidation must be prevented and the joint must be capable of inspection when completed to determine the soundness of the weld.

Heretofore it has been impossible to form a welded joint such as illustrated in Fig. 1 interiorly of the tube 40 and tube sheet opening 44 when the tubular parts were of small diameter because of inaccessibility to the location of the weld rendering it difficult to form a satisfactory and sound continuous weld.

Welding tools of various constructions have been known and used in the art in which the tip could be adjusted or pointed in a particular direction and the parts to be welded rotated for forming a continuous weld. However, it is impossible, as a practical matter, to rotate a large tube sheet of a large heat exchanger selectively on the axis of each tube to be welded thereto in order to utilize known welding tools for forming a continuous weld.

Thus, in order to form a sound and uniform internal weld of the type illustrated at 43 in small-diameter tubular parts where the parts must be held stationary during welding, it is necessary that the welding tool be rotated.

It is further necessary to supply not only welding current but inert shielding gas to the rotating tip of the welding tool when the arc is established and to maintain such current and shielding gas supply to the arc as the weld is being continuously formed.

Furthermore, if the continuous internal weld 43 is to be sound and uniform, the spacing of the tip 25 from the parts being welded must be maintained uniform as the tip 25 traverses the welded area during the continuous formation of the welded joint.

Finally, since the diameters of tubular parts to be welded may vary, and since the location of the weld 43 axially with respect to one end of the tubular parts being welded, such as the upper surface 45 of the tube sheet 41, may vary with changes in sizes of the parts being welded, any welding tool for performing such an operation to be practical, must be adjustable so that the position of the tip 25 can be adjusted axially and so that the size of the circle traversed by the tip during rotation thereof can be changed.

The improved welding tool illustrated satisfies all of the conditions indicated, required for forming a satisfactory and sound internal weld between small-diameter tubular parts. The illustration in Fig. 1 of the improved welding tool construction has been drawn, for example, at twice scale so that the tube 40 and tube opening 44 through tube sheet 41 are illustrated at twice the size of a typical example of parts to be joined. For the sake of convenience, the thickness of the tube sheet 41 is diagrammaticaly illustrated in Fig. 1 as being much thinner than would be normal in a typical example wherein longer insulator sleeves 21 and 22 and a longer electrode 19 might be required.

Fig. 2 illustrates diagrammatically the circular path traversed by the welding tip when the spindle is rotated with the parts adjusted as shown. In this view, the distributor discs 3 and 4 are adjusted and clamped by clamping bolt 5 so that the axis of the collet means coincides with the axis of the spindle 2. When the spindle 2 is rotated, the electrode tip 25 moves in a circular path indicated by the dot-dash circle 46 having a minimum diameter 47.

Fig. 4 similarly shows the parts adjusted by turning the retainer disc 4 clockwise 90° (viewing Fig. 4) with respect to distributor disc 3. In this position of adjustment, also illustrated in Fig. 3, the tip 25 traverses a circular path indicated by the dot-dash circle 48 having a diameter 49 upon rotation of the spindle 2.

Fig. 6 illustrates the position of adjustment of the tool parts for obtaining maximum circular travel of the tip 25 upon rotation of the spindle 2. This maximum travel is accomplished by a 180° adjustment of the retainer disc 4 with respect to the distributor disc 3, from the position shown in Fig. 1; and in this position of adjustment, the tip 25 traverses a circular path indicated by the dot-dash circle 50 having a maximum diameter 51.

In use, the improved welding tool 1 may be adjusted to properly position the discs 3 and 4 to correspond to the internal diameter of the tubular parts to be welded. Also, the correct length of electrode 19 and insulator sleeves 21 and 22 are assembled with the tool so that the tip 25 may be located at the proper depth within the tubular parts to be welded. The parts to be welded are then fixed and held in proper position with the tube 40 and nipple 42 aligned. The tip 25 of the welding tool is inserted and located opposite the line of the weld to be formed within the tubular parts, and the spindle 2 is then rotated at the proper speed to form a continuous weld after an arc is struck between the tip 25 and the parts being welded with arc shielding gas supplied to the tool.

Accordingly the present invention provides an improved welding tool construction in which the tip may be rotated within the tubular parts at the proper speed and at a fixed distance from the weld as the weld is being formed; provides a construction in which the tip may be adjusted both axially and for rotation in paths of different diameters to accommodate tubular parts of different small-diameter sizes; provides a construction in which welding current and arc shielding gas may be supplied to the arc throughout the welding operation and during rotation of the tip; and provides a construction which may be readily adjusted, operated and used for forming internal welds of the character described.

In the foregoing description, certain terms have been used for brevity, clearness and understanding, but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example, and the scope of the invention is not limited to the exact details illustrated and described.

Having now described the various features, discoveries and principles of the invention, the construction and operation of a preferred form of improved rotatable arc welding tool, and the advantageous, new and useful results obtained thereby; the new and useful discoveries, principles, apparatus, combinations, parts, sub-combinations and elements, and mechanical equivalents apparent to those skilled in the art, are set forth in the appended claims.

I claim:

1. A rotatable arc welding tool including a rotatable spindle, a collet means, means mounting the collet means on the spindle for rotation therewith, means for adjusting the location of the axis of the collet means with respect to the spindle to various selected adjusted concentric and eccentric positions, a welding electrode extending axially of and clamped in various positions of axial adjustment by the collet means, tubular insulating sleeve means through which the electrode extends having nozzle means, the electrode having a tip located adjacent and exteriorly spaced from the nozzle means, and means for supplying arc shielding gas to said nozzle through said insulating sleeve means during rotation of the collet means with the spindle.

2. A rotatable arc welding tool at set forth in claim 1 in which the collet mounting means and the collet adjusting means include a distributor disc mounted on the spindle, a retainer disc rotatably mounted on the distributor disc eccentrically of the spindle axis, means for clamping said discs together in various selected positions of adjustment of one with respect to the other, and in which the collet means is mounted on the retainer disc with its axis in alignment with the axis of the spindle in one adjusted position of the discs.

3. A rotatable arc welding tool as set forth in claim 1 in which the collet means includes a collet retainer mounted for rotation with the spindle, collet jaws within the collet retainer for engaging the electrode, and a collet holder engaging the retainer and jaws for clamping the jaws against the electrode.

4. A rotatable arc welding tool as set forth in claim 1 in which the means for supplying arc shielding gas to the nozzle includes a stationary gas inlet housing surrounding a portion of the spindle, passages formed in the spindle and collet mounting means communicating with said housing, and other passages formed in the collet means communicating between said first-named passages and the interior of the insulating sleeve means.

5. A rotatable arc welding tool as set forth in claim 1 in which an insulator sleeve is provided surrounding the collet means, and in which the tubular insulating sleeve means through which the electrode extends is connected to the insulator sleeve by a flexible insulating coupling.

6. A rotatable arc welding tool as set forth in claim 1 in which the tubular insulating sleeve means includes separable tubular parts coupled at one end with the collet means and terminating at the other end in an elbow forming the nozzle means, and in which the electrode is provided with a curved portion extending through said elbow terminating in the tip located adjacent and exteriorly spaced from the nozzle means.

7. A rotatable arc welding tool including a rotatable spindle; collet means including a collet retainer, collet jaws within the retainer and a collet holder clamping the jaws to the retainer; a distributor disc mounted on the spindle for rotation therewith, a retainer disc rotatably mounted on the distributor disc eccentrically with respect to the axis of the spindle, means for clamping the discs together in various selected positions of rotatable adjustment; means mounting the collet retainer on the retainer disc; a welding electrode extending axially of and clamped in various positions of axial adjustment by the collet means; tubular insulating sleeve means through which the electrode extends having nozzle means; the electrode having a tip located adjacent and exteriorly spaced from the nozzle means; a stationary gas inlet housing surrounding a portion of the spindle, there being passages formed in the spindle communicating with the interior of said housing, there being passages formed in at least one of the discs communicating with said spindle passages, and there being passages formed in said collet means communicating with the disc passages and the interior of the insulating sleeve means.

8. A rotatable arc welding tool including a rotatable member, a welding electrode, means for mounting the welding electrode on the rotatable member, the welding electrode including an electrode tip extending substantially radially of the rotatable member, means for varying the distance between the electrode tip and the axis of the rotatable member, tubular means enclosing the electrode having an opening through which the electrode tip extends, and means for supplying arc shielding gas through said tubular means to said opening during rotation of the rotatable member.

References Cited in the file of this patent

UNITED STATES PATENTS

| | | |
|---|---|---|
| 1,949,251 | Gilbert | Oct. 27, 1934 |
| 2,400,285 | Buck | May 14, 1946 |
| 2,510,205 | Baird | June 6, 1950 |
| 2,571,684 | Craven | Oct. 16, 1951 |
| 2,580,398 | Broswell | Jan. 1, 1952 |
| 2,685,631 | Scheller | Aug. 3, 1954 |
| 2,721,248 | Kirkpatrick | Oct. 18, 1955 |
| 2,770,708 | Briggs | Nov. 13, 1956 |